(12) United States Patent
Maupin

(10) Patent No.: US 11,312,215 B2
(45) Date of Patent: Apr. 26, 2022

(54) TAILGATE AIR DIVERTER TARP

(71) Applicant: John Runnels Maupin, Corpus Christi, TX (US)

(72) Inventor: John Runnels Maupin, Corpus Christi, TX (US)

( * ) Notice: Subject to any disclaimer, the term of this patent is extended or adjusted under 35 U.S.C. 154(b) by 358 days.

(21) Appl. No.: 16/588,249

(22) Filed: Sep. 30, 2019

(65) Prior Publication Data

US 2020/0101824 A1 Apr. 2, 2020

Related U.S. Application Data

(60) Provisional application No. 62/738,218, filed on Sep. 28, 2018.

(51) Int. Cl.
*B60J 7/10* (2006.01)
*B62D 35/00* (2006.01)

(52) U.S. Cl.
CPC ............. *B60J 7/104* (2013.01); *B62D 35/00* (2013.01)

(58) Field of Classification Search
CPC .... B60J 7/104; B60J 7/102; B60J 7/10; B60P 7/04; B62D 35/00
USPC ................................................... 296/100.16
See application file for complete search history.

(56) References Cited

U.S. PATENT DOCUMENTS

| | | | |
|---|---|---|---|
| 4,585,263 A | 4/1986 | Hesner | |
| 5,069,498 A | 12/1991 | Benchoff | |
| 5,234,249 A | 8/1993 | Dorrell | |
| 5,431,474 A * | 7/1995 | Burkey | B60J 7/104 296/100.15 |
| 5,435,616 A | 7/1995 | Corner | |
| 5,498,058 A | 3/1996 | Kuo | |
| 5,551,747 A | 9/1996 | Larsen | |
| 5,735,567 A | 4/1998 | Mora, Sr. | |
| 5,743,589 A | 4/1998 | Felker | |
| 6,003,929 A * | 12/1999 | Birdsell | B60P 7/0876 150/166 |
| 6,206,444 B1 | 3/2001 | Casey | |
| 6,517,140 B2 | 2/2003 | Wilde | |
| 7,090,287 B1 | 8/2006 | Eberst | |
| 7,954,881 B2 | 6/2011 | Berg | |
| 8,727,424 B1 | 5/2014 | Nelson | |
| 2005/0264034 A1 | 12/2005 | Flores | |
| 2006/0043769 A1 | 3/2006 | Lehmann | |
| 2007/0057528 A1* | 3/2007 | Fox | B60P 7/0876 296/100.16 |

* cited by examiner

*Primary Examiner* — Joseph D. Pape
(74) *Attorney, Agent, or Firm* — Dunlap Bennett & Ludwig, PLLC; Brendan E. Squire

(57) ABSTRACT

A tail gate air diverter tarp provides a streamlined airflow across the bed of a truck to substantially reduce drag on the truck and improve gas mileage. The tail gate air diverter tarp is configured for a universal fit in a truck bed across a variety of manufacturers. The tail gate air diverter tarp has a web reinforced perimeter and a pair of cam buckles attached to the web reinforced perimeter at each corner of the tarp, with one cam buckle oriented in a lateral direction and the other cam buckle oriented in a lateral direction. A cinching strap adjustable couples selected cam buckles with a mount carried in the bed of the truck.

10 Claims, 3 Drawing Sheets

TAILGATE AIR DIVERTER TARP

CROSS-REFERENCE TO RELATED APPLICATION

This application claims the benefit of priority of U.S. provisional application No. 62/738,218, filed Sep. 28, 2018, the contents of which are herein incorporated by reference.

BACKGROUND OF THE INVENTION

The present invention relates to truck beds and, more particularly, to covers for truck beds.

For trucks, such a pickup trucks with an open bed and tail gate structure, air drag acting on the tail gate can reduce fuel mileage for the vehicle. While various bed covers exist in the art, these are generally fixed structures, such as lift lids or camper/utility style caps. While these are effective at reducing wind induced drag, their fixed nature tends to limit the flexibility and versatility of the truck bed in carrying a variety of different shapes and sizes of loads or the ability to load the bed. Likewise, while these fixed structures may be removable, it is often a significant inconvenience to do so.

As can be seen, there is a need for an improved cover for a truck bed that is convenient to install and remove to retain the intended versatility of the truck bed.

SUMMARY OF THE INVENTION

In one aspect of the present invention, a tail gate air diverter tarp is disclosed. The tail gate air diverter tarp includes a generally rectangular sheet of fabric material, dimensioned to correspond to a length and a width of a truck bed. A web reinforced hem is defined around a perimeter of the sheet. An attachment loop secures a cam buckle to the web reinforced hem at each corner of the sheet with a cam buckle disposed in each of a longitudinal and a lateral length of the sheet.

In some embodiments, the tail gate air diverter tarp also includes a lateral web attached to the sheet at an intermediate position between a front end of the sheet and a back end of the sheet and extending from a first lateral side to a second lateral side of the sheet. A lateral attachment loop securing a lateral cam buckle to the lateral web at each of the first lateral side and the second lateral side of the sheet.

The sheet may be formed from a nylon material of between 10 oz. and 40 oz. weight. The sheet may also be formed of a vinyl covered nylon. The length of the sheet corresponds to a diagonal length of the bed between a bottom end of a front of the bed and a top end of a tail gate defining a back of the bed.

A cinching strap is configured to interconnect the cam buckle with a mount attached within the truck bed.

In other aspects of the invention a method of removably installing a tail gate air diverter in a truck bed having a tail gate is disclosed. The method includes providing a generally rectangular sheet of fabric material, dimensioned to correspond to a length and a width of a truck bed; sheet having a web reinforced hem defined around a perimeter of the sheet; an attachment loop securing a cam buckle to the web reinforced hem at each corner of the sheet with a cam buckle disposed in each of a longitudinal and a lateral length of the sheet. The web reinforced hem may be formed by the attachment of a web strap to the sheet, such as via stitching, bonding or melding. A cinching strap interconnects between at least one cam buckle at each corner of the sheet and a mount attached within the truck bed.

The method may also include interconnecting the cinching strap with a back upper mount disposed at a top of the truck bed at a back end thereof so that the web reinforced hem of a back edge of the sheet is in abutment with a top edge of a tail gate of the truck bed.

In a preferred embodiment, the method includes interconnecting the cinching strap with a front lower mount disposed at a bottom of the truck bed at a front end thereof, such that the sheet is inclined from the front end of the truck bed to the back end of the truck bed.

In other embodiments, a cinching strap interconnects between lateral cam buckle that is attached via a lateral attachment strap to a lateral web attached to the sheet at an intermediate position between a front end of the sheet and a back end of the sheet and extending from a first lateral side to a second lateral side of the sheet with a mount attached to an intermediate position within the truck bed.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the tail gate air diverter tarp of the present invention provides an improved truck bed cover that reduces the air induced drag imparted on a tail gate of the truck bed, while retaining the versatility of the truck bed to carry and load a variety of items.

Figure 1:
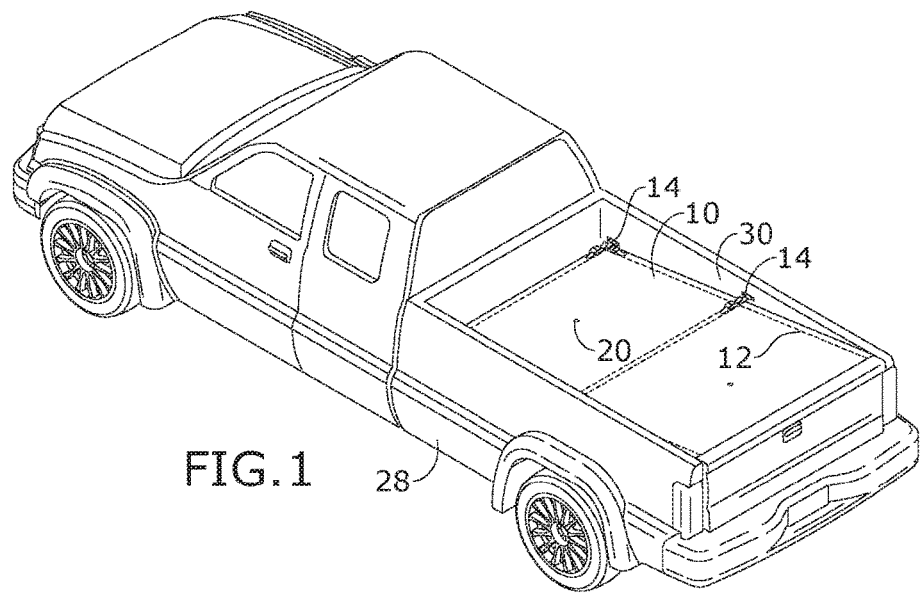
FIG. 1 is a perspective view of the a tail gate air diverter tarp, shown in use.
Figure 2:
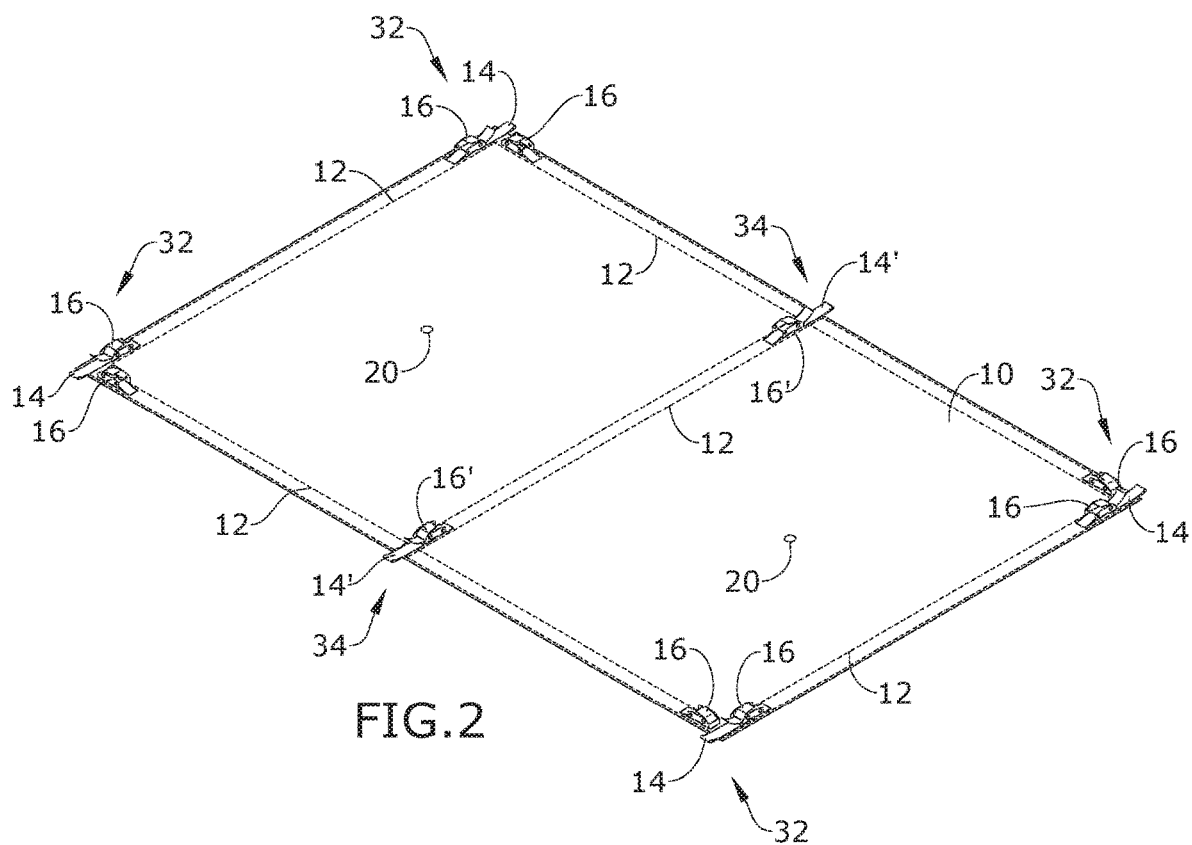
FIG. 2 is a perspective view of the a tail gate air diverter tarp.
Figure 3:
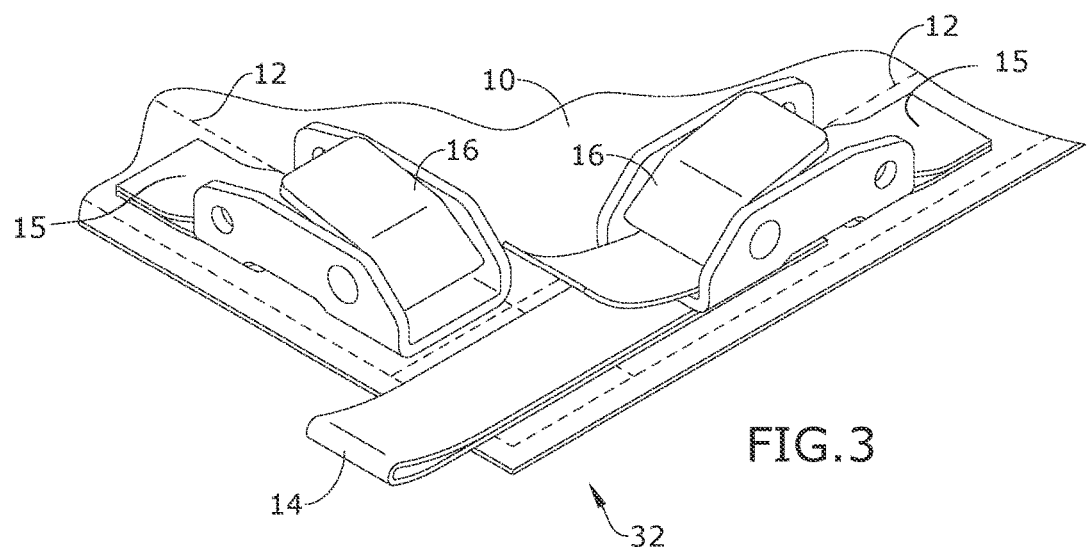
FIG. 3 is a detail perspective view of strap 14 and 16.
Figure 4:
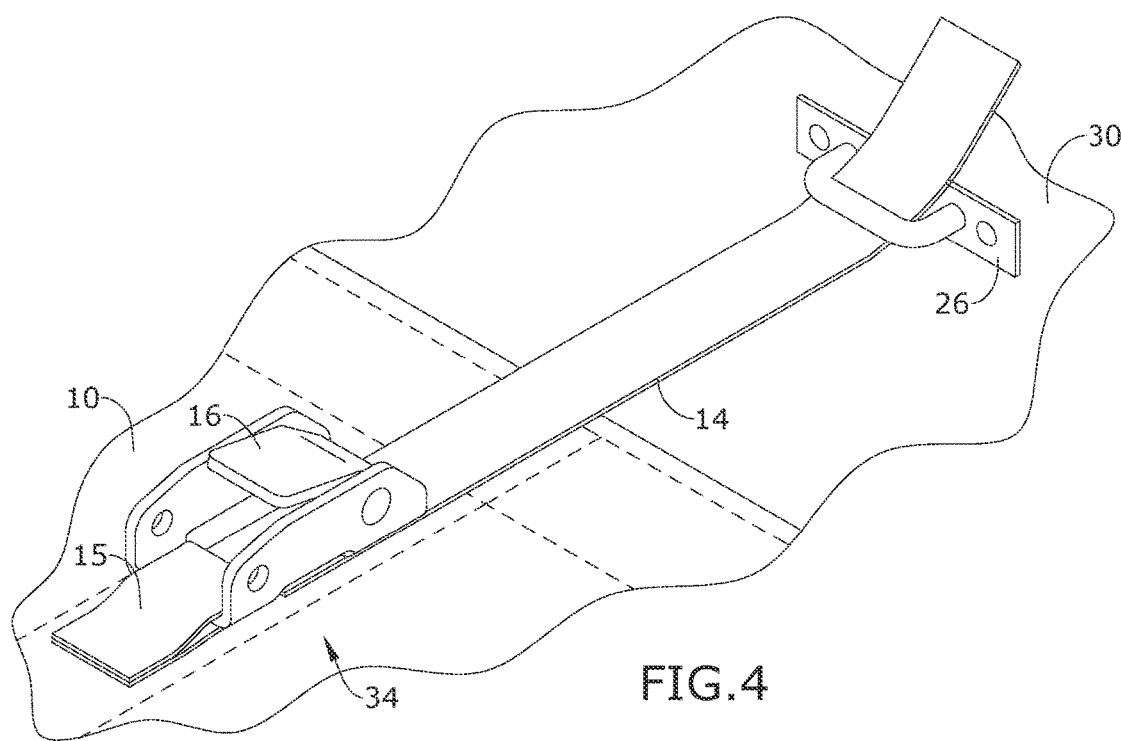
FIG. 4 is a detail perspective view of the a tail gate air diverter tarp, illustrating the placement of strap 14 onto bracket 26.
Figure 5:
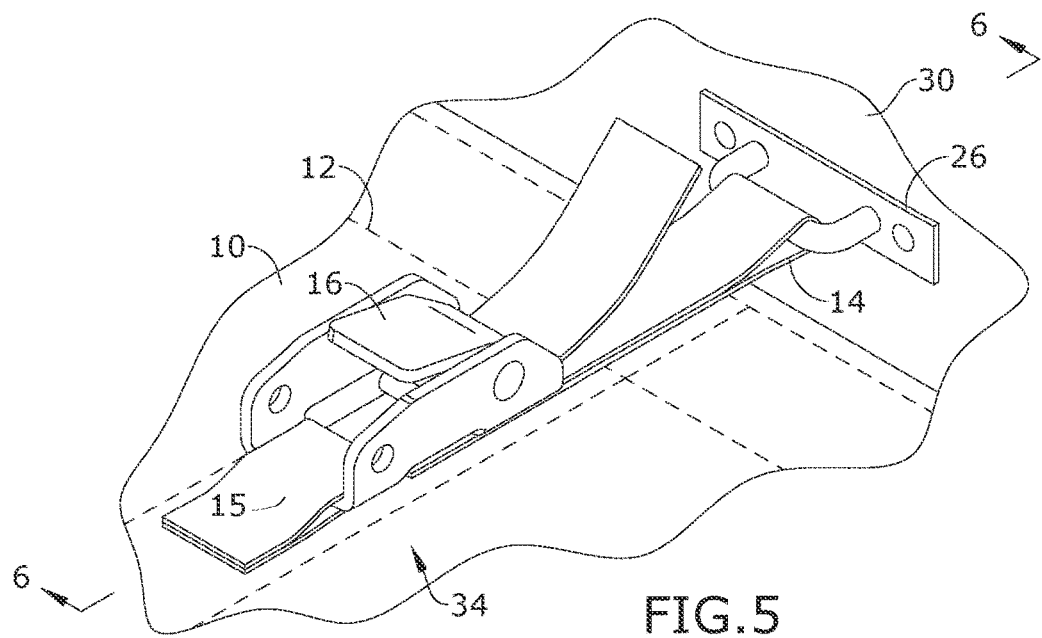
FIG. 5 is a detail perspective view of the a tail gate air diverter tarp in an installed position.
Figure 6:
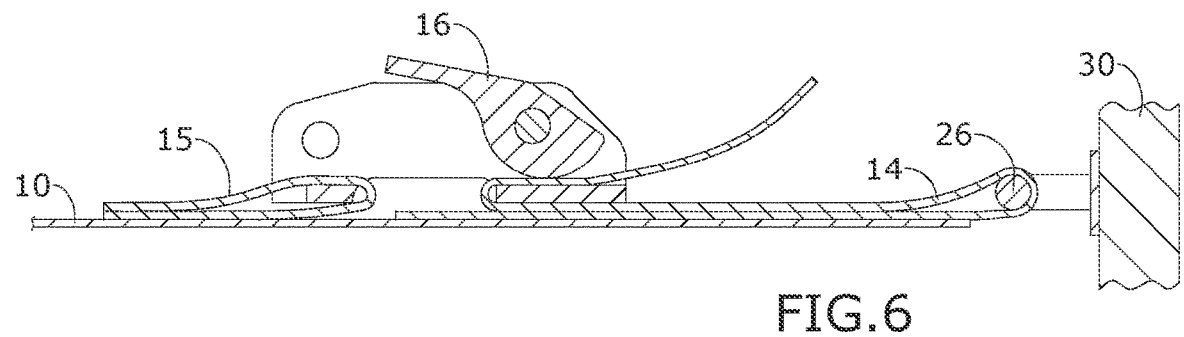
FIG. 6 is a section view of the a tail gate air diverter tarp, taken along line 6-6 in FIG. 5.

As seen in reference to the drawings of FIGS. 1-6, a tail gate air diverter tarp 10 according to aspects of the present invention includes a generally rectangular sheet of material having a plurality of web reinforced hems 12 defined around a perimeter of the sheet. The web reinforced hems 12 include a hem to which a web strap is attached, such as via stitching, bonding, or melding. The material may include a 10 oz. to 40 oz. nylon material. Preferably, the nylon material has a vinyl coating. The sheet with web reinforced hems 12 are dimensioned to fit within a bed 30 of a truck 28 to which it is attached. The dimensions may vary from between about 4 feet to 8 feet two inches in length and from between about 4 feet to 5 feet in width.

An attachment loop 15 is attached to the web reinforced hem 12 to secure a cam buckle 16 at the corners of the tarp 10, defining a corner buckle assembly 32, with a cam buckle 16 oriented in each of a longitudinal and a lateral direction to provide a universal fit for the tail gate air diverter tarp 10 to any truck bed 30.

The tail gate air diverter tarp 10 may also include a lateral web 12 reinforcement disposed at an intermediate position of the tarp 10. An attachment loop 15 attaches the lateral cam buckle 16' to the intermediate web reinforcement 12 for a lateral buckle assembly 32. Typically, the intermediate web reinforcement 12 will be positioned at a mid point of the tail gate air diverter tarp 10.

A cinching strap 14 interconnects the cam buckle 16 with a mount 26 that is attached to a wall of the truck bed 30. The mount 26 may be provided with the tail gate air diverter tarp 10. The mount 26 may also include one or more existing mounts 26 in the bed 30 of the truck 28. In some truck beds 30 mounts may be provided in a bottom surface of the bed 30 or along a rail surrounding a top end of the bed 30. In other truck beds 30, a post hole, or stake hole may be provided along the rail of the bed 30. The stake hole may receive a coupling for a mount 26.

A grommet 20 may be positioned in an interior space of the tarp 10 to prevent the accumulation of water on the tarp 10, so that it may drain from the bed 30 according to the truck manufacturer's drainage plan. IN some embodiments, the cinching strap may further comprise an attachment hook 24 to secure the strap to the mount 26.

In use, the tail gate air diverter tarp 10 is attached in the bed 30 of the vehicle 28. When a load is not carried in the bed 30, the tail gate air diverter tarp 10 is mounted in the bed 30 in an inclined orientation from a front end of the bed to a back end of the bed. By way of non-limiting example, the cinching strap 14 interconnects a front end of the tarp 10 to a mount 26 at a bottom of the bed 30 while a cinching strap 14 interconnects a back end of the tarp 10 a mount 26 at one of a top end of the bed 30 or a mount 26 that is along the rail of the bed 30. It is preferable to attach the back end of the tarp 10 to the bed 30 first so that a close fitting edge can be formed along the tailgate. With the back end of the tarp 10 attached, the front end of the tarp 10 can then be secured using the cinching straps 14 and cam buckle 16. In this manner, any gap that may be present due to a differential in a length of the tarp 10 and a diagonal length of the bed 30 may be accommodated below the flow line of the airflow over a cab of the truck 28.

With the tail gate air diverter tarp 10 installed in this matter, air flow is guided up a surface of the tarp 10 gradually to eliminate abruptly encountering the tailgate of the bed 30. The intermediate strap 14' may be connected to one of a bottom, a mid, or a top mount 26 of the bed 30. The intermediate strap 14' prevents the tarp 10 from flapping between the front end and the back end of the tarp 10. When installed the tail gate air diverter tarp 10 has improved gas mileage up to 10%.

The tail gate air diverter tarp 10 may also be utilized to cover loads, particularly irregular sized loads in the pickup bed 30 and still provide substantial fuel savings. Each of the straps 14 may adjustably interconnect with the cam buckles 16 of the tarp 10 to secure the tarp 10 about the load. The close fit of the back end of the tarp 10 with the tail gate of the bed 30 improves airflow over the bed 30 and achieves an increase in fuel economy for the vehicle 28.

It should be understood, of course, that the foregoing relates to exemplary embodiments of the invention and that modifications may be made without departing from the spirit and scope of the invention as set forth in the following claims.

What is claimed is:

1. A tail gate air diverter tarp, comprising:
   a generally rectangular sheet of fabric material, dimensioned to correspond to a length and a width of a truck bed;
   a web reinforced hem defined around a perimeter of the generally rectangular sheet; and
   an attachment loop securing each one of a pair of cam buckles to the web reinforced hem at each corner of the sheet with one of said pair of cam buckles being disposed in a longitudinal and a lateral length of the sheet and the other one of said pair of cam buckles being disposed in a lateral length of the sheet.

2. The tail gate air diverter tarp of claim 1, further comprising:
   a lateral web attached to the generally rectangular sheet at an intermediate position between a front end of the generally rectangular sheet and a back end of the generally rectangular sheet and extending from a first lateral side to a second lateral side of the generally rectangular sheet; and
   a lateral attachment loop securing a lateral cam buckle to the lateral web at each of the first lateral side and the second lateral side of the generally rectangular sheet.

3. The tail gate air diverter tarp of claim 1, wherein the generally rectangular sheet is formed from a nylon material of between 10 oz. and 40 oz. weight.

4. The tail gate air diverter tarp of claim 3, wherein the generally rectangular sheet is a vinyl covered nylon.

5. The tail gate air diverter tarp of claim 1, further comprising:
   a cinching strap configured to interconnect at least one of each pair of cam buckles with a corresponding mount attached within the truck bed.

6. The tail gate air diverter tarp of claim 1, wherein the length of the generally rectangular sheet corresponds to a diagonal length of the truck bed between a bottom end of a front of the truck bed and a top end of a tail gate defining a back of the truck bed.

7. A method of removably installing a tail gate air diverter in a truck bed having a tail gate, comprising:
   providing a generally rectangular sheet of fabric material, dimensioned to correspond to a length and a width of the truck bed; the generally rectangular sheet having a web reinforced hem defined around a perimeter of the generally rectangular sheet; an attachment loop securing each one of a pair of cam buckles to the web reinforced hem at each corner of the generally rectangular sheet with one of said pair of cam buckles disposed in a longitudinal length of the generally rectangular sheet and a second of the pair of cam buckles being disposed in a lateral length of the sheet; and
   interconnecting a cinching strap between at least one of the pair of cam buckles at each corner of the generally rectangular sheet and a mount attached at each corner of the truck bed.

8. The method of claim 7, wherein the mount at each corner of the truck bed further comprises:
   a back upper mount disposed at a top of the truck bed at opposite back lateral sides thereof, so that the web reinforced hem of a back edge of the generally rectangular sheet is in abutment with a top edge of the tail gate of the truck bed, when the tail gate is in a closed condition.

9. The method of claim 8, wherein the mount at each corner of the truck bed further comprises:

a pair of front lower mounts disposed at a bottom of the truck bed at opposite front lateral sides thereof, such that the generally rectangular sheet is inclined from the front end of the truck bed to the back end of the truck bed.

10. The method of claim 9, further comprising:

interconnecting a lateral cinching strap between each of a pair of lateral cam buckles that are attached via a lateral attachment loop to a lateral web, the lateral web attached to the generally rectangular sheet at an intermediate position between a front end of the generally rectangular sheet and a back end of the generally rectangular sheet and extending from a first lateral side to a second lateral side of the generally rectangular sheet, the lateral cinching strap connected with an intermediate mount attached to an intermediate position within the truck bed, at one of a bottom, a mid, and a top elevation of the truck bed.

\* \* \* \* \*